United States Patent [19]

Liu

[11] 4,327,337
[45] Apr. 27, 1982

[54] INTRACAVITY RAMAN FREQUENCY CONVERSION IN A HIGH POWER LASER

[75] Inventor: Yung S. Liu, Scotia, N.Y.

[73] Assignee: General Electric Company, Schenectady, N.Y.

[21] Appl. No.: 109,359

[22] Filed: Jan. 3, 1980

[51] Int. Cl.³ .............................................. H01S 3/30
[52] U.S. Cl. ........................................ 372/3; 372/20; 372/21; 372/108
[58] Field of Search ............... 331/94.5 N, 107 R; 307/426, 107 R

[56] References Cited

U.S. PATENT DOCUMENTS

| | | | |
|---|---|---|---|
| 4,144,464 | 3/1979 | Loree et al. | 331/94.5 R |
| 4,165,469 | 8/1979 | Ammann | 307/426 |
| 4,180,751 | 12/1979 | Ammann | 331/107 R |
| 4,194,170 | 3/1980 | Kurnit | 331/94.5 N |

Primary Examiner—William L. Sikes
Assistant Examiner—Leon Scott, Jr.
Attorney, Agent, or Firm—Alexander M. Gerasimow; James C. Davis, Jr.; Marvin Snyder

[57] ABSTRACT

A gaseous Raman conversion medium is placed inside a laser resonant cavity to generate tunable laser radiation in the visible, near infrared and far infrared spectral ranges with an improved conversion efficiency and a higher power output. The combination of the laser medium, a gaseous Raman medium and nonlinear sum and difference generation using intracavity conversion produces coherent radiation at a frequency distinct from the frequency emitted by the laser medium. This new frequency is coupled out of the cavity as the desired output.

21 Claims, 3 Drawing Figures

INTRACAVITY RAMAN FREQUENCY CONVERSION IN A HIGH POWER LASER

BACKGROUND OF THE INVENTION

This invention relates to tunable lasers, and more particularly, to such lasers employing a gaseous Raman medium disposed within the laser cavity of a high power laser operated in the average power range greater than 10 watts.

A high power tunable laser source operating in the visible, infrared and far infrared frequency ranges is an essential tool for laser-induced chemical reactions, chemical synthesis, and remote measurements in air and in flames. Tunable lasers having a high power capability (e.g., 10 watts or greater) and operating in this kind of wide spectral range have yet to be developed. To operate a solid state laser in the spectral range described, some technique is required to modify the output frequency of the radiation emitted by a solid state laser.

An intense laser beam incident upon a molecular medium with internal (vibrational or rotational) degrees of freedom will be scattered by that medium by a variety of processes. In one of these, Raman scattering, following excitation a molecule is left in an excited vibrational state, and the scattered photon produced by interaction with the medium has lost energy in an amount equal to that which the molecule has gained, called Raman scattering. The presence of photons at the Stokes wavelength can increase the rate of scattering events of this sort, and, therefore, cause amplification of the Stokes beam produced by the return of excited molecules to their ground stage, called stimulated Raman scattering (SRS) to produce an oscillating beam of coherent electromagnetic radiation at the Stokes wavelength.

One prior art technique of laser frequency conversion employs a solid Raman medium disposed within the laser cavity, such as that described in U.S. Pat. No. 4,048,516, issued Sept. 13, 1977 to Ammann. Ammann discloses employing a solid Raman and frequency doubling medium within the laser cavity to produce an output beam having a higher frequency than the laser pump beam. In Ammann, the solid Raman medium employed limits both the spectral tuning range and the tunable output power than can be obtained from the laser cavity. Such limitations are described by the patentee in his article, "Simultaneous Stimulated Raman Scattering and Optical Frequency Mixing in Lithium Iodate", *Applied Physics Letters,* volume 34, No. 12, June 15, 1979, pages 838–840. The tuning range obtained using a cavity configuration similar to that shown in U.S. Pat. No. 4,048,516 was reported to be limited to less than 1.5 $\mu$m using a lithium iodate crystal ($LiIO_3$) as the Raman medium inside a Nd:YAG laser cavity.

SUMMARY OF THE INVENTION

An object of the instant invention is to provide a high power tunable laser which provides an output in the visible, infrared and far infrared frequency range, not directly available from the laser. A further object of the instant invention is to employ a gaseous Raman medium within the cavity of a high power laser to produce tuning of the output beam in a frequency range not directly available from the laser.

The instant invention employs a laser cavity having a laser medium disposed therein in optical alignment therewith and a Raman cell containing a gaseous Raman medium disposed in a resonant cavity in optical alignment with the laser medium to shift the frequency of the output beam of the laser. The instant invention further comprises the method of exciting the lasing medium to produce a beam of coherent electromagnetic radiation, passing the beam through a Raman medium disposed in a Raman resonant cavity to produce a resultant laser radiation having a frequency equal to the difference between the pump beam frequency and the characteristic frequency of the Raman medium, and coupling said resultant laser radiation out of said cavity. In a further modification of the instant invention output in the visible and far infrared range may be achieved by sum and difference frequency generation using an intracavity non-linear crystal.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by reference to the following description taken in conjunction with the accompanying drawings in which:

DESCRIPTION OF THE PREFERRED EMBODIMENTS

Figure 1:
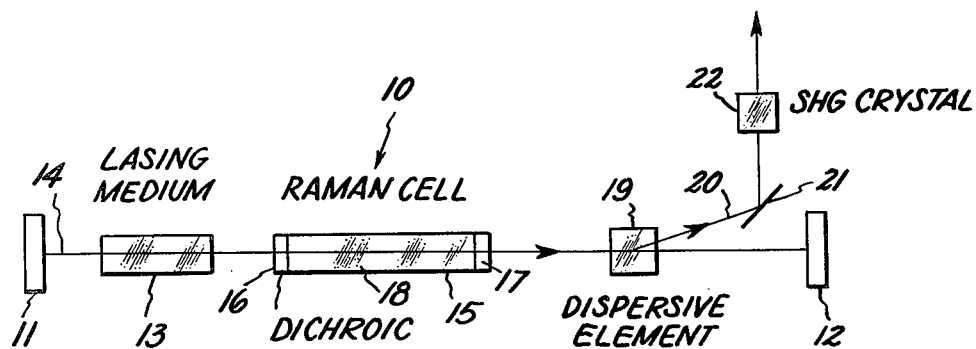
FIG. 1 is a block diagram showing a laser cavity incorporating a Raman conversion medium of the instant invention.
Figure 2:
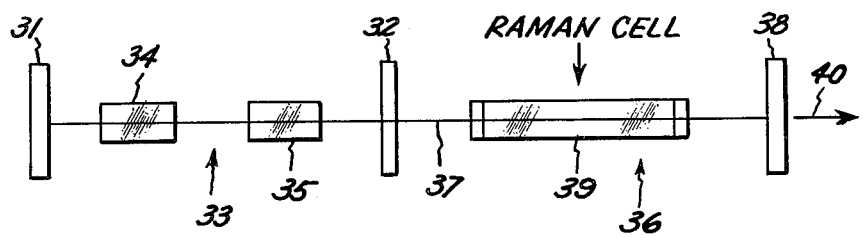
FIG. 2 is a block diagram showing an alternative laser cavity configuration assembled according to the instant invention.
Figure 3:
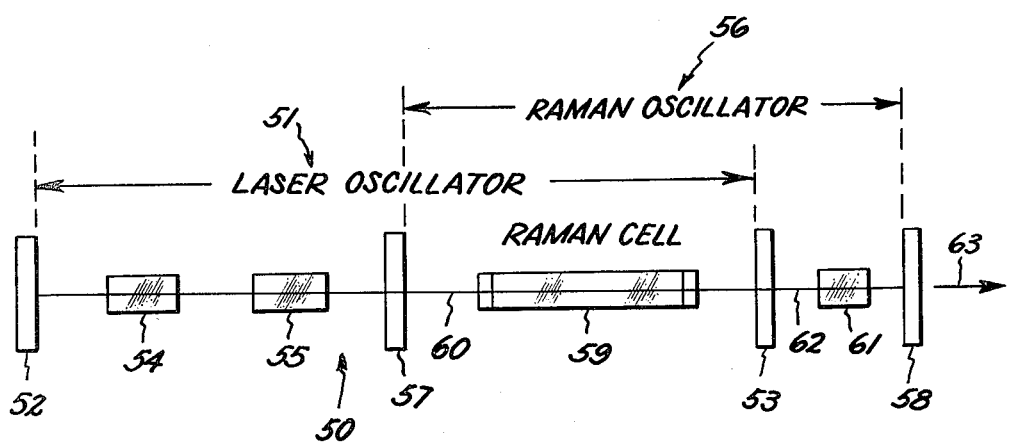
FIG. 3 is a block diagram illustrating an alternative embodiment of the instant invention.

The specific features of the instant invention described herein and shown in FIGS. 1–3 are merely exemplary, and the scope of the invention is defined in the appended claims. Throughout the description and FIGS. 1–3, like reference characters refer to like elements of the invention.

The instant invention employs Raman scattering in a gaseous medium to frequency down-shift a high power laser to produce tunable coherent radiation in a particular useful frequency range. In the instant invention, both tuning range (i.e. range of frequencies at which tuned output may be obtained) and the power handling capability of the laser are greatly improved by using a gas or a mixture of gases as the Raman medium. A gaseous Raman medium combines the advantages of high optical damage threshold, and therefore a higher power handling capability; a wider optical frequency transmission range; a wider optical tuning range, and a preservation of good beam quality.

Referring now to the drawings, FIG. 1 illustrates a laser cavity 10 defined by mirrors 11 and 12. A lasing medium 13 such as Nd:YAG laser, Nd:glass laser, excimer laser, ruby laser, metal vapor laser, or other type laser is disposed between mirrors 11 and 12 and aligned therewith, such that a beam 14 of coherent electromagnetic radiation will pass through said lasing medium in an optical path between mirrors 11 and 12. A Raman medium 15 is disposed in optical alignment with the lasing medium 13 within the cavity 10. Raman cell 15 comprises a pair of dichroic end mirrors 16 and 17 and a gaseous medium disposed in the space 18 between mirrors 16 and 17. Laser cavity 10 also includes a dispersive element 19 for coupling a particular output wavelength out of the laser cavity. The output beam 20 may be reflected by a mirror 21 through a frequency doubling crystal 22 to provide a desired output in a shorter spectral range. Raman cell 15 may contain any appropriate Raman-active gaseous medium including $D_2$, $H_2$, $N_2O$, $CO_2$, $SF_6$, NO, CO, HBr, $N_2$, etc. Among these gases, $H_2$ and $D_2$ are the most commonly used Raman media, because of their high Raman gain and high conversion efficiency.

The laser cavity shown in FIG. 1 operates as follows for example: The Nd:YAG laser is pumped from a source of excitation, such as flash lamps, to produce a laser beam of electromagnetic radiation which passes through the Raman cell 15 a plurality of times as it oscillates between mirrors 11 and 12. Raman cell 15 absorbs part of the energy of beam 14. The Raman cell down-shifts the laser frequency by the characteristic frequency of the Raman medium within the cavity to produce an output beam which oscillates between mirrors 11 and 12 having a frequency, $\omega_R$, equal to the pump laser frequency $\omega_o$, minus the Raman frequency $\Delta\omega_R$. The dispersive element 19 is oriented such that the oscillating Raman beam is coupled out of the cavity 10 and impinges upon mirror 21. A doubling crystal 22 may be positioned such that the output beam 20 passes therethrough in order to provide a resultant beam with a wavelength of half that of the output beam 20. By employing this technique, an output beam having a wavelength in the range of 0.55 to 5.0 micrometers from a high power Nd:YAG laser can be readily achieved using various gases as the Raman medium.

FIG. 2 illustrates an alternative embodiment of the instant invention. FIG. 2 shows a double resonant intracavity Raman oscillator 30 in which mirrors 31 and 38 define a pump cavity 33 within which laser medium 34, such as Nd:YAG, and Q-switch 35 are disposed in optical alignment with the mirrors 31 and 38. Pump cavity 33 also includes Raman resonant cavity 36, which overlaps pump cavity 33, disposed in optical alignment with the beam 37 of electromagnetic radiation produced by the laser medium 34. The Raman resonant cavity 36 is defined by mirrors 32 and 38 and includes a Raman cell 39. The laser medium 34 produces a beam 37 of electromagnetic radiation which oscillates between the mirrors 31 and 38. Mirror 31 is 100% reflective at the frequency $\omega_o$ of the laser medium 34. Mirror 32 is a dichroic mirror 100% transmissive at the pump frequency $\omega_o$ of the Nd:YAG laser, and 100% reflective at the frequency $\omega_R$ which equals pump frequency of the laser minus the characteristic frequency $\Delta\omega_R$ of the Raman medium 39. Mirror 38 is a dichroic mirror 100% reflective at the pump frequency of the Nd:YAG laser 34 and partially reflective at the frequency $\omega_R$. In this way both the pump beam and the beam having the frequency $\omega_R$ pass through the Raman cell, but only the pump beam passes through the Q-switch and the Nd:YAG laser. The Raman conversion process further serves as a non-linear medium to regulate the high peak power circulating inside the laser cavity 33 and thus reduces the risk of damage to the components in laser cavity 33. The mirror 38 is the output mirror of the embodiment shown in FIG. 2.

Since the pump cavity 33 and the Raman cavity 36 are shared resonant cavities, the cavity length of each can be adjusted, such that the cavity modes of each of the resonant cavities can be matched. Since the Raman beam oscillates between the mirrors 32 and 38, it gains in intensity with each passage through the Raman medium, so that a high power output beam (e.g. above 10 watts) may be generated at the Raman frequency $\omega_R$.

A further alternative embodiment of my instant invention is shown in FIG. 3. A laser device 50 comprises a YAG oscillator cavity 51 defined by mirrors 52 and 53 in optical alignment and a laser 54, such as a Nd:YAG laser, and Q-switch 55 disposed within the Nd:YAG oscillator cavity 51 in optical alignment with each other and with mirrors 57 and 58 and has Raman cell 59 disposed therein in optical alignment with the beam 60 generated by the Nd:YAG laser 54. A non-linear crystal 61 such as $LiNbO_3$ crystal for doubling, sum and difference frequency generation is disposed between mirrors 53 and 58 within the Raman oscillator cavity 56.

The embodiment shown in FIG. 3 operates as follows. The Nd:YAG laser 54 in conjunction with Q-switch 55 produces a pulsed beam 60 which oscillates between mirrors 52 and 53 and passes through Raman cell 59. The mirror 57 is dichroic and transmits 100% of the radiation at the pump frequency $\omega_o$ of laser 54. The Raman cell 59 creates the Raman output frequency $\omega_R$ which equals the pump frequency $\omega_o$ minus the characteristic Raman frequency $\Delta\omega_R$ to produce beam 60 which oscillates within Raman oscillator cavity 56. Mirror 57 is 100% reflective of radiation at the Raman output frequency $\omega_R$ and dichroic mirror 53 is 100% reflective of the pump beam frequency $\omega_o$ and 100% transmissive to the Raman output beam at $\omega_R$. The mirror 58 is 100% transmissive of the doubled frequency $2\omega_R$ produced by doubling crystal 61 within the Raman oscillator cavity 56.

The dichroic mirror 53 may be selected to be partially transmissive (e.g. about 10%) of the pump beam frequency $\omega_o$ and 100% transmissive of the Raman output beam at the frequency $\omega_R$. Such a construction would allow generation of sum and difference frequencies, $\omega_R + \omega_o$ and $\omega_o - \omega_R$, respectively, in the non-linear crystal 61 of $LiNbO_3$ or other appropriate materials. Generation of the difference frequency $\omega_o - \omega_R$ will provide a technique for generating coherent output at frequencies in the far infrared range.

By employing the invention described herein, the tuning range of a high power laser may be extended to longer wavelengths than are available with prior art techniques. In particular, a solid state laser output beam wavelength may be shifted to the wavelength range of 0.55–5.0 micrometers or even to the far infrared range, which is not directly available from solid state or other lasers. The use of a gaseous Raman medium overcomes the problem of damage of a solid Raman medium due to power density of the oscillating beam passing therethrough. Further, use of a gaseous Raman medium allows ready change of laser output beam frequency by changing the Raman medium to a different gas or gas mixture having a characteristic frequency as required to down-shift the laser beam frequency to the particular desired output frequency.

A typical pump beam for a Nd:YAG laser is 1.06 micrometers. Employing a gaseous Raman medium, a high power pump laser at 1.06 micrometers may be employed at a power level exceeding 100 watts and a repetition rate of several Hz. With a 10% efficiency, an output beam in the infrared frequency range of a few tens of watt may be generated. A commercially-available Nd:YAG laser (Holobeam Model No. 2660-2RQ) may be employed as the pump laser of the instant invention. Alternatively, a Nd:glass laser, a dye laser or other type laser may be used as the excitation source for the Raman cell. The Raman cell could employ any one or more of the gases $D_2$, $H_2$, $N_2O$, $CO_2$, $SF_6$, HBr, $N_2$ in the appropriate mixture to create the necessary Raman characteristic frequency to produce the desired output frequency.

The properties of the instant invention employing a gaseous Raman medium allow the production of tunable laser output extended to the longer infrared wavelength range and greater high power level (i.e. 10 watts or greater output). Therefore, it can readily be seen that the instant invention provides the tuning capability for high power infrared wavelength generation far exceeding that obtainable with the prior art.

I claim:

1. A method for tuning a laser in the visible and infrared range using intracavity Raman conversion comprising the steps of:

exciting a lasing medium to produce a pump beam of coherent electromagnetic radiation oscillating within a laser cavity;

passing said pump beam through a gaseous Raman-active medium disposed in said cavity such that said pump beam passes therethrough a plurality of times, said Raman-active medium scattering a portion of pump beam energy and shifting the frequency of said pump beam by a characteristic frequency of said Raman-active medium to create a Raman beam having a frequency equal to the difference between the frequency of said pump beam and the Raman characteristic frequency of said Raman medium; and coupling at least part of said Raman beam out of said cavity as an output beam through a dispersive element disposed in said cavity.

2. The method of claim 1 wherein said step of passing said pump beam through a Raman-active medium comprises passing said pump beam through a cell containing a Raman-active gas selected from a group of gases consisting of: $H_2$, $D_2$, $N_2O$, $CO_2$, $SF_6$, $NO_2$, CO, HBr and $N_2$.

3. A method for tuning a laser in the visible and infrared range using intracavity Raman conversion comprising the steps of:

exciting a lasing medium to produce a pump beam of coherent electromagnetic radiation oscillating within a laser cavity;

passing said pump beam through a gaseous Raman-active medium disposed in said cavity such that said pump beam passes therethrough a plurality of times, said Raman-active medium scattering a portion of pump beam energy and down-shifting the frequency of said pump beam by a characteristic frequency of said Raman-active medium to create a Raman beam having a frequency equal to the difference between the frequency of said pump beam and the Raman characteristic frequency of said Raman medium; and wherein said step of passing said pump beam through said gaseous Raman-active medium includes the steps of:

impinging said pump beam upon a first dichroic mirror completely transmissive of electromagnetic radiation at the frequency of said pump beam and completely reflective of electromagnetic radiation at the frequency of said Raman beam;

passing said pump beam through said Raman-active medium; and reflecting said pump beam from an end mirror disposed adjacent said Raman-active medium; said end mirror comprising a second dichroic mirror completely reflective of electromagnetic radiation at the frequency of said pump beam and completely transmissive of electromagnetic radiation at the frequency of said Raman beam;

passing said Raman beam through said dichroic end mirror and through a frequency doubling crystal disposed outside said laser cavity and in optical alignment therewith and adjacent said dichroic end mirror;

and impinging said Raman beam upon a third dichroic mirror disposed adjacent said doubling crystal and opposite said dichroic end mirror; said third dichroic mirror being completely reflective of electromagnetic radiation at the frequency of said Raman beam and completely transmissive of electromagnetic radiation at a frequency of twice that of said Raman beam, to produce an output beam having a frequency twice that of said Raman beam.

4. A method for tuning a laser in the visible and infrared range using intracavity Raman conversion comprising the steps of:

exciting a lasing medium to produce a pump beam of coherent electromagnetic radiation oscillating within a laser cavity;

passing said pump beam through a gaseous Raman-active medium disposed in said cavity such that said pump beam passes therethrough a plurality of times, said Raman-active medium absorbing a portion of pump beam energy and down-shifting the frequency of said pump beam by a characteristic frequency of said Raman-active medium to create a Raman beam having frequency equal to the difference between the frequency of said pump beam and the Raman characteristic frequency of said Raman medium; and wherein said step of passing said pump beam through said gaseous Raman-active medium includes the steps of:

impinging said pump beam upon a first dichroic mirror completely transmissive of electromagnetic radiation at the frequency of said pump beam and completely reflective of electromagnetic radiation at the frequency of said Raman beam;

passing said pump beam through said Raman-active medium, and partially reflecting said pump beam from an end mirror disposed adjacent said Raman-active medium; said end mirror being a second dichroic mirror partially reflective of electromagnetic radiation at the frequency of said pump beam and completely transmissive of electromagnetic radiation at the frequency of said Raman beam;

passing said Raman beam through said dichroic end mirror;

passing said Raman beam and part of said pump beam through a nonlinear crystal disposed outside said laser cavity and in optical alignment therewith and adjacent said dichroic end mirror to produce an output beam having a frequency equal to the difference between said pump beam frequency and said Raman beam frequency or the sum of said frequencies;

and impinging said Raman beam upon a third dichroic mirror disposed adjacent said nonlinear crystal and in optical alignment with said laser cavity and opposite said dichroic end mirror; said third dichroic mirror being completely reflective of electromagnetic radiation at the frequency of said output having a frequency equal to the difference between or sum of said pump beam and Raman beam frequencies.

5. Apparatus for producing a tuned laser comprising:
a laser cavity defined by two optically-aligned reflector means; said cavity containing a laser medium for producing a beam of coherent electromagnetic radiation at a predetermined laser frequency;
a Raman cell disposed in said cavity in optical alignment with said reflector means; said Raman cell containing a gaseous Raman-active medium for producing a Raman beam having a frequency lower than said predetermined laser frequency; and
an optically dispersive element disposed in said laser cavity for coupling out at least part of said Raman beam from said laser cavity.

6. The apparatus of claim 5 wherein said Raman cell contains a Raman-active gas selected from the group of gases consisting of: $D_2$, $H_2$, $N_2O$, $CO_2$, $SF_6$, NO, CO, HBr and $N_2$.

7. The apparatus of claim 6 wherein said laser medium comprises a Nd:YAG laser; and wherein a Q-switch is disposed in said laser cavity in optical alignment with said laser medium.

8. The apparatus of claim 6 wherein said laser medium comprises a Nd:glass laser medium; and wherein a Q-switch is disposed in said laser cavity in optical alignment with said laser medium.

9. The apparatus of claim 6 wherein said laser medium comprises a Ruby laser medium.

10. The apparatus of claim 6 wherein said laser medium comprises an excimer laser medium.

11. The apparatus of claim 6 wherein said laser medium comprises a metal vapor laser medium.

12. Apparatus for producing a tuned laser comprising:
a laser cavity defined by two optically-aligned reflector means, said cavity containing a laser medium for producing a beam of coherent electromagnetic radiation at a predetermined laser frequency;
a Raman cell disposed in said cavity in optical alignment with said reflector means, said Raman cell containing a gaseous Raman-active medium for producing a Raman beam having a frequency lower than said predetermined laser frequency;
a first dichroic mirror disposed within said laser cavity between said laser medium and said Raman cell and in optical alignment with said laser medium and said Raman cell, said first dichroic mirror being completely transmissive of electromagnetic radiation at the frequency emitted by said laser medium and completely reflective of electromagnetic radiation at the frequency of said Raman beam;
wherein the one of said reflector means disposed adjacent said Raman cell comprises a second dichroic mirror, said second dichroic mirror being completely reflective of electromagnetic radiation at the frequency emitted by said laser medium and completely transmissive of electromagnetic radiation at the frequency of said Raman beam; and
said apparatus further comprises:
a frequency doubling crystal disposed outside said laser cavity adjacent said second dichroic mirror and in optical alignment with said laser medium and said Raman cell, and
a third dichroic mirror disposed adjacent said frequency doubling crystal opposite said second dichroic mirror in optical alignment with said laser medium and said Raman cell, said third dichroic mirror being completely reflective of electromagnetic radiation at the frequency of said Raman beam and completely transmissive of electromagnetic radiation at a frequency of twice that of said Raman beam.

13. The apparatus of claim 12 wherein said laser medium comprises a Nd:glass laser; and wherein a Q-switch is disposed in said laser cavity in optical alignment with said laser medium.

14. The apparatus of claim 12 wherein said laser medium comprises a ruby laser medium.

15. The apparatus of claim 12 wherein said laser medium comprises an excimer laser medium.

16. The apparatus of claim 12 wherein said laser medium comprises a Nd:YAG laser medium; and wherein a Q-switch is disposed in said laser cavity in optical alignment with said laser medium.

17. Apparatus for producing a tuned laser comprising:
a laser cavity defined by two optically-aligned reflector means, said cavity containing a laser medium for producing a beam of coherent electromagnetic radiation at a predetermined laser frequency;
a Raman cell disposed in said cavity in optical alignment with said reflector means, said Raman cell containing a gaseous Raman-active medium for producing a Raman beam having a frequency lower than said predetermined laser frequency;
a first dichroic mirror disposed within said laser cavity between said laser medium and said Raman cell and in optical alignment with said laser medium and said Raman cell, said first dichroic mirror being completely transmissive of electromagnetic radiation at the frequency emitted by said laser medium and completely reflective of electromagnetic radiation at the frequency of said Raman beam;
wherein the one of said reflector means disposed adjacent said Raman cell comprises a second dichroic mirror, said second dichroic mirror being partially reflective of electromagnetic radiation at the frequency emitted by said laser medium and completely transmissive of electromagnetic radiation at the frequency of said Raman beam; and
said apparatus further comprises
a nonlinear crystal disposed outside said laser cavity adjacent said second dichroic mirror and in optical alignment with said laser medium and said Raman cell; and
a third dichroic mirror disposed adjacent said nonlinear crystal opposite said second dichroic mirror in optical alignment with said laser medium and said Raman cell, said third dichroic mirror being completely reflective of electromagnetic radiation at the frequency of said Raman beam and completely transmissive of electromagnetic radiation emitted by said nonlinear crystal at a frequency equal to the difference or the sum of the pump beam and said Raman beam.

18. The apparatus of claim 17 wherein said non-linear crystal comprises a lithium niobate crystal capable of generating electromagnetic radiation at a frequency equal to the difference between or the sum of the frequency emitted by said laser medium and the frequency of said Raman beam.

19. The apparatus of claim 18 wherein said laser medium comprises a Nd:glass laser medium; and wherein a Q-switch is disposed in said laser cavity in optical alignment with said laser medium.

20. The apparatus of claim 18 wherein said laser medium comprises a Nd:YAG laser medium; and wherein a Q-switch is disposed in said laser cavity in optical alignment with said laser medium.

21. The apparatus of claim 18 wherein said laser medium comprises an excimer laser medium.

* * * * *